United States Patent
O'Hare et al.

(10) Patent No.: US 6,766,147 B2
(45) Date of Patent: Jul. 20, 2004

(54) APPARATUS AND METHOD FOR IMPLEMENTING TEXT BASED COMPRESSION USING CACHE AND BLANK APPROACH

(75) Inventors: John B. O'Hare, Ballintemple (IE); Andrew M. Allen, Mundelein, IL (US); Stephen D. Magee, Scottsdale, AZ (US); Colleen Yue Ling Cheung, Swindon (GB); Ishita Majumdar, Schaumburg, IL (US); Gerry T. Foster, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 265 days.

(21) Appl. No.: 10/184,286

(22) Filed: Jun. 27, 2002

(65) Prior Publication Data

US 2003/0013431 A1 Jan. 16, 2003

Related U.S. Application Data

(60) Provisional application No. 60/302,455, filed on Jun. 29, 2001.

(51) Int. Cl.[7] .............................. H04B 7/00; H04J 3/24; G06F 7/00; H03M 7/34
(52) U.S. Cl. ...................... 455/72; 455/412.1; 341/51; 375/240; 370/474; 708/203
(58) Field of Search .................. 455/72, 412.1, 455/414.1, 414.4, 422.1; 341/51, 87; 704/222, 500–504; 382/232; 380/269; 708/203; 370/474; 375/240, 240.22; 707/101

(56) References Cited

U.S. PATENT DOCUMENTS

| | | | | |
|---|---|---|---|---|
| 5,521,940 A | * | 5/1996 | Lane et al. | 375/240 |
| 5,815,096 A | * | 9/1998 | Smith | 341/51 |
| 6,226,628 B1 | * | 5/2001 | Forbes | 707/1 |
| 6,260,060 B1 | * | 7/2001 | Moore | 709/206 |
| 6,438,123 B1 | * | 8/2002 | Chapman | 370/351 |

* cited by examiner

Primary Examiner—Duc M. Nguyen
(74) Attorney, Agent, or Firm—Lalita W. Pace

(57) ABSTRACT

An apparatus and method for compressing and compressing text based messages. A TCCB layer 114, 115 is added to a mobile device 100 and P-CSCF 102. At the sending device, the TCCB compression method is invoked to remove all redundant header information contained in a message to be transmitted. When the TCCB compression method detects that a header's contents are the same as previously sent or received for a particular sequence, the TCCB method blanks the header contents. At the receiving device, when the TCCB layer receives a message with blank header contents, the TCCB decompression method is invoked to reconstruct the header from its cache 115, 127.

9 Claims, 5 Drawing Sheets

| TABLE | INDEX | CONTENTS |
|---|---|---|
| REQUEST LINE | sip:watson@bell-tel.com | sip:bell-tel.com SIP/2.0 |
| VIA | sip:watson@bell-tel.com | SIP/2.0/UDP saturn.bell-tel.com |
| FROM | sip:watson@bell-tel.com | <sip:watson@bell-tel.com> TAG=19a1 |
| CALL ID | sip:watson@bell-tel.com | 70710@saturn.bell-tel.com |
| CSEQ | sip:watson@bell-tel.com | 1 REGISTER |
| CONTACT | sip:watson@bell-tel.com | <sip:watson@saturn.bell-tel.com:3890; transport=udp> |
| EXPIRES | sip:watson@bell-tel.com | 7200 |

*FIG. 4*

| TABLE | INDEX | CONTENTS |
|---|---|---|
| REQUEST LINE | sip:watson@bell-tel.com | sip:bell-tel.com SIP/2.0 |
| VIA | sip:watson@bell-tel.com | SIP/2.0/UDP saturn.bell-tel.com |
| FROM | sip:watson@bell-tel.com | <sip:watson@bell-tel.com> TAG=19a1 |
| CALL ID | sip:watson@bell-tel.com | 70710@saturn.bell-tel.com |
| CSEQ | sip:watson@bell-tel.com | 1 REGISTER |
| CONTACT | sip:watson@bell-tel.com | <sip:watson@saturn.bell-tel.com:3890; transport=udp> |
| EXPIRES | sip:watson@bell-tel.com | 7200 |

*FIG. 5*

| TABLE | INDEX | CONTENTS |
|---|---|---|
| REQUEST LINE | sip:watson@bell-tel.com | Sip:bell-tel.com SIP/2.0 |
| | +sip:simpson@bell-tel.com | sip:simpson@springfield.bell-tel.com SIP/2.0 |
| VIA | sip:watson@bell-tel.com | SIP/2.0/UDP saturn.bell-tel.com |
| CALL-ID | sip:watson@bell-tel.com | 70710@saturn.bell-tel.com |
| | +sip:simpson@bell-tel.com | 662606876@saturn.bell-tel.com |
| CSEQ | sip:watson@bell-tel.com | 1 REGISTER |
| | +sip:simpson@bell-tel.com | 6 INVITE |
| CONTACT | sip:watson@bell-tel.com | <sip:watson@saturn.bell-tel.com:3890; transport=udp> |
| | +sip:simpson@bell-tel.com | <sip:watson@saturn.bell-tel.com> |
| SUBJECT | sip:watson@bell-tel.com | MR. SIMPSON, GOING TO MOE'S? |
| | +sip:simpson@bell-tel.com | MR. SIMPSON, GOING TO MOE'S? |
| CONTENT TYPE | sip:watson@bell-tel.com | APPLICATION/sdp |
| | +sip:simpson@bell-tel.com | APPLICATION/sdp |

APPARATUS AND METHOD FOR IMPLEMENTING TEXT BASED COMPRESSION USING CACHE AND BLANK APPROACH

REFERENCE(S) TO RELATED APPLICATION(S)

The present application claims priority from provisional application, Serial No. 60/302,455, entitled "APPARATUS AND METHOD FOR IMPLEMENTING TEXT BASED COMPRESSION USING CACHE AND BLANK APPROACH," filed Jun. 29, 2001, which is commonly owned and incorporated herein by reference in its entirety.

FIELD OF THE INVENTION

The present invention relates generally to the field of communication systems, and more particularly, to text based compression schemes.

BACKGROUND OF THE INVENTION

Currently, telephony service is provided for the most part over circuit switched networks. A fast emerging new trend called IP telephony provides telephony service over Internet Protocol (IP) networks. The motivating factors for carrying voice traffic over data networks are the integration of voice and data applications, which can result in more effective business process, cost savings for voice calls and enabling of many new services for business and customers. The flexibility offered by IP telephony lies in moving the intelligence from the network to the end stations, thereby enabling many new services that did not exist before. In an effort to merge Internet and cellular telephony, two aspects are focused on—end-to-end call set up delay and voice quality.

Protocols such as Session Initiated Protocol (SIP) and Session Description Protocol (SDP) will typically be used to set up and tear down calls. However, adopting ASCII based protocols such as SIP and SDP in access networks of limited bandwidth incurs a significant delay for call set up; Passing large text messages over the air interface also results in a very inefficient use of the transmission medium. In addition, some legacy based enhanced time division multiplexed (TDM) cellular transceivers, such as GSM EDGE Radio Access Network (GERAN), will need to "steal" audio bandwidth in order to transmit in-call SIP signaling messages. This stealing of audio bandwidth will likely result in long audio mutes.

Thus there is a need for a method of compressing text based messages in order to increase spectrum efficiency, reduce transmission delay and provide a comparable level of quality of service compared with circuit switched systems.

BRIEF DESCRIPTION OF THE DRAWINGS

FIG. 4 is a snapshot of the mobile device cache after sending a registration message for the first time.

FIG. 5 is a snapshot of the core network cache after a registration message is processed by the TCCB layer for the first time.

FIG. 6 is a snapshot of the mobile device cache after an "INVITE" message is processed by the TCCB layer for the first time.

DETAILED DESCRIPTION OF THE DRAWINGS

The present invention provides a method and apparatus for compressing text based messages in order to increase spectrum efficiency, reduce transmission delay and provide a comparable level of quality of service compared with circuit switched systems. In particular, the present invention provides an apparatus and method for performing Text-based Compression using a Cache and Blank approach (TCCB). TCCB is designed to be extensible. It can work over various access technologies and the principle applies to any text based protocols. An advantage of the TCCB method is that only the User Equipment (UE) (e.g. mobile device) and the Peer Core Network Entity (e.g. Proxy CSCF) need be involved in the storage and retrieval of information to compress or decompress the text based messages.

Figure 1:
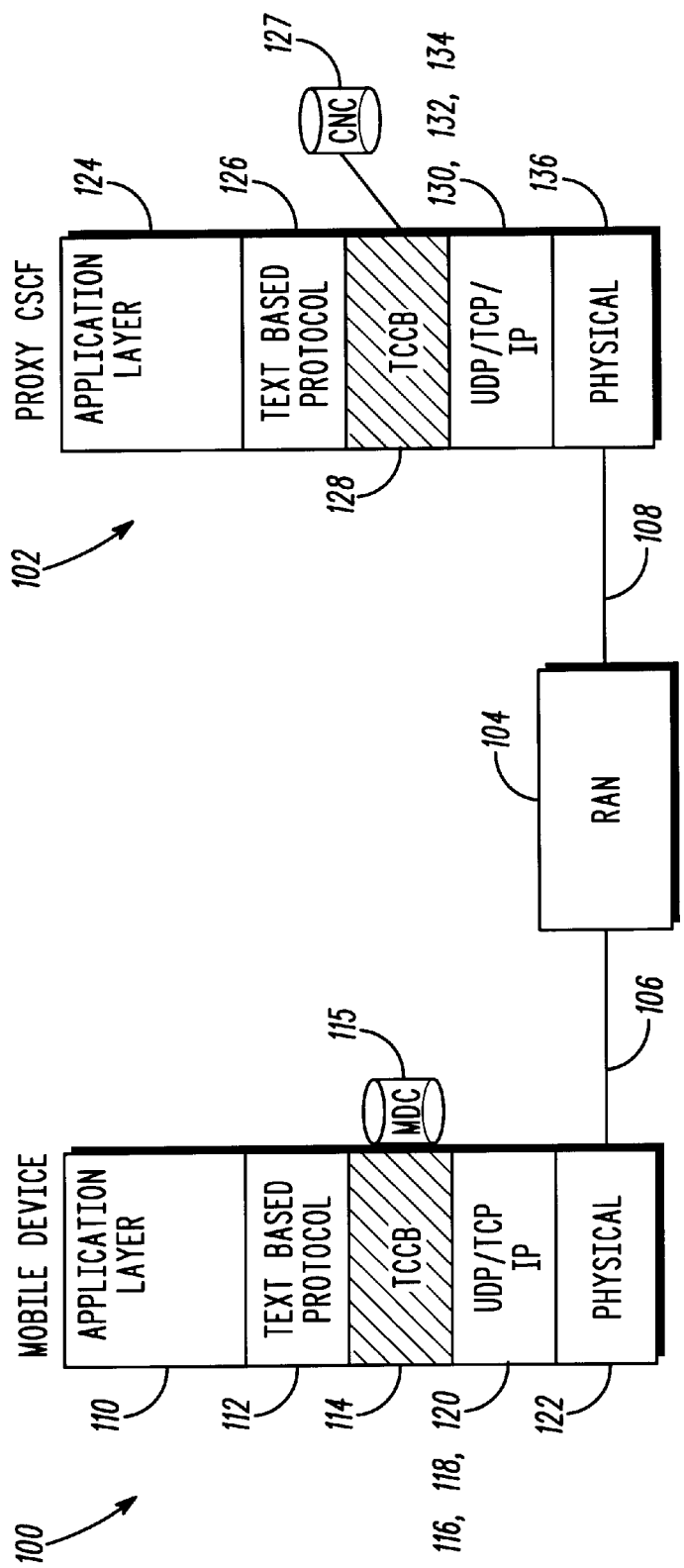
FIG. 1 is a block diagram of an architecture that can be used to implement the TCCB apparatus and method of the present invention.

FIG. 1 is a block diagram of an architecture that can be used to implement the TCCB apparatus and method of the present invention. In the preferred embodiment, the architecture includes a mobile device 100 and a Proxy CSCF (P-CSCF) 102 coupled to a Radio Access Network (RAN) 104. The mobile device 100 is coupled to the RAN 104 through an air interface 106, while the P-CSCF 102 is coupled to the RAN 104 through an IP interface 108. Refer to Section 5 of TR 23.821 v1.0.0 (2000–06) and Section 5.6.1.1 of 3GPP TS 23.060 v4.0.0 (2001–03) for a more detailed description of the functionality and connectivity of the aforementioned components. As known in the art, the software architecture of the mobile device 100 and P-CSCF 102 typically includes a seven (7) layer stack running on a microprocessor. The stack includes from top to bottom, an application layer 110, 124; a Text Based Protocol (TBP) layer 112, 126; a User Datagram Protocol (UDP) layer 116, 130; a Transmission Control Protocol (TCP) layer 118, 132; an IP layer 120, 134; and a physical layer 122, 136. The UDP, IP and TCP layers are generally referred to as the lower transport layers. A detailed description of the OSI reference model (7 layered model) can be found in "Computer Networks" (2nd Edition) by Andrew S. Tannenbaum, pgs. 15–20. The present invention introduces an additional TCCB layer 114, 128. In the preferred embodiment, the TCCB layer 114, 128 is positioned between the TBP layer 112, 126 and the lower transport layers. The TCCB layer 114, 128 is added so that the mobile device 100 and P-CSCF 102 can communicate using compressed messages. In the mobile device 100, the TCCB layer 114 includes a mobile device cache (MDC) 115. In the P-CSCF 102, the TCCB layer 128 includes a core network cache (CNC) 127. As will be described with reference to the TCCB method of the present invention, the MDC 115 and CNC 127 are used to store tables of information used to compress and decompress messages transmitted between the mobile device 100 and the P-CSCF 102. The TCCB method of the present invention can be implemented using any commercially available microprocessors.

The TCCB layer 114, 128 in both the mobile device 100 and the P-CSCF 102 includes the compression method and decompression method of the present invention. When either the mobile device 100 or P-CSCF 102 prepares to transmit a message, the TCCB compression method is invoked to remove all redundant header information contained in the message. Redundant header information is information originating from the sending device that is already stored in the MDC 115 or CNC 127 of the receiving device. This could occur, for example, when a header's contents have not changed from a previously transmitted message for a particular session. When the TCCB compression method detects that a header's contents are the same as previously sent or received for a particular sequence, the TCCB method blanks the header contents. At the receiving device, when the TCCB layer receives a message with blank header contents, the TCCB decompression method is invoked to reconstruct the header from its cache. Details of the compression method and decompression method will be described with reference to the flow charts of FIGS. 2 and 3.

Figure 2:
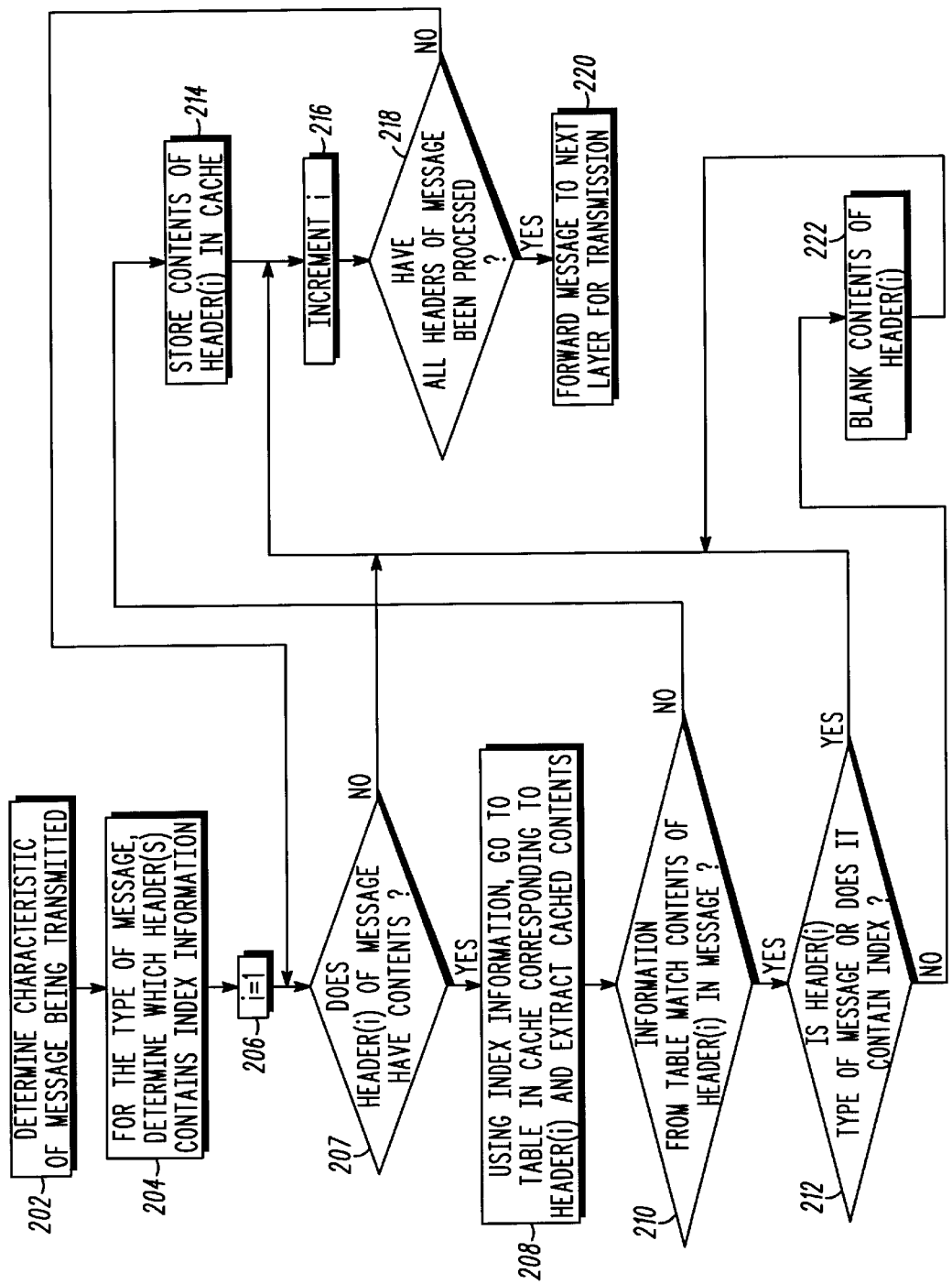
FIG. 2 is a flow diagram of the preferred embodiment of the TCCB compression method of the present invention.

FIG. 2 is a flow diagram of the preferred embodiment of the TCCB compression method of the present invention. At step 202, the method determines the characteristic (e.g. type) of the message being transmitted. For the type of message, the method determines which header(s) of the message contains the correct index information into the cache 115 or 127 (step 204). For example, if the mobile device 100 is transmitting the message, the correct index information into cache 115 is determined at step 204. At step 206, the method initializes a variable "i." This variable is used to track the particular header of the message that is being operated on. At step 207, the method determines whether the header(i) has contents. If the header has contents, at step 208, the method uses the index information into the MDC 115 or CNC 127 and extracts the contents of header(i) from a table. At step 210, the method determines whether the information from the table matches the contents of header(i) in the message. If the information does not match, the method stores the contents of header(i) from the message in the table at step 214. At step 216, the method increments "i" to point to the next header for processing. At step 218, the method determines whether all headers of the message have been processed. If all headers have been processed, the method forwards the message to one of the lower transport layers 116, 118, 120, 130, 132, 134 (FIG. 1) for transmission (step 220). If all headers have not been processed, the method returns to step 208 to continue processing the remaining headers.

Referring back to step 207, if the header(i) does not have contents, the method proceeds to step 216 where "i" is incremented to continue processing of any remaining headers. Referring back to step 210, if the information from the table matches the contents of header(i) in the message, at step 212 the method determines whether header(i) is the type of message or whether header (i) contains the index information into the cache. If header(i) is not the type of message and does not contain the index information, the method blanks the contents of header(i) (step 222). Next, the method increments "i" (step 216) and proceeds to continue processing of any remaining headers. If at step 212 the method determines that the header(i) is the type of message or contains the index information into the cache, the method skips step 222 and increments "i" at step 216 to continue processing of any remaining headers. In the preferred embodiment, the header representing the type of message (Request Line) and the header containing the index information can not be blanked.

Figure 3:
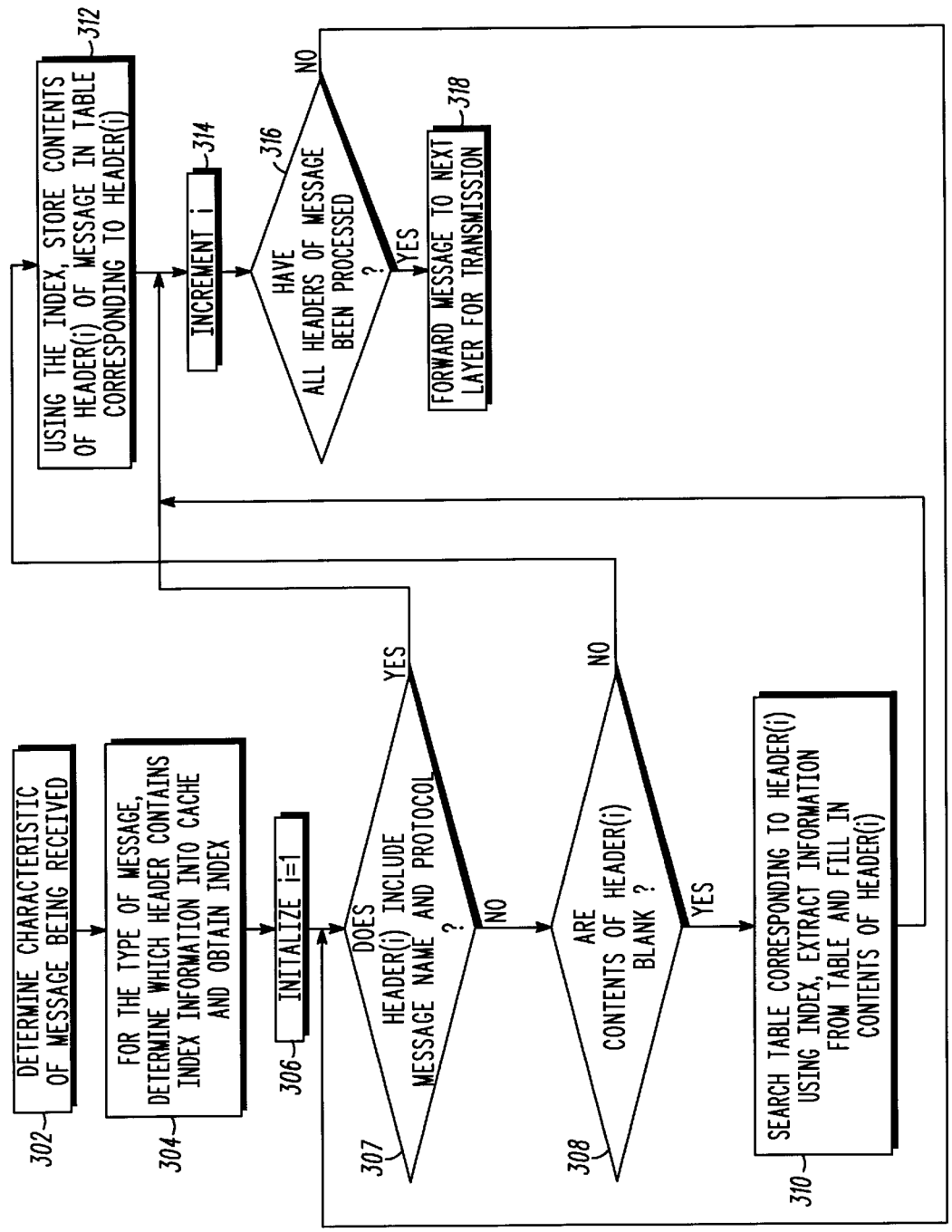
FIG. 3 is a flow diagram of the preferred embodiment of the TCCB decompression method of the present invention.

FIG. 3 is flow diagram of the preferred embodiment of the TCCB decompression method of the present invention. At step 302, the method determines the characteristic (e.g. type) of the message being received. For the characteristic determined, the method determines which header(s) of the message contains the correct index information into the cache 115 or 127 (step 304). For example, if the P-CSCF 102 is receiving the message, the correct index information into cache 127 will be determined at step 304. At step 306, the method initializes variable "i" to 1. At step 307, the method determines whether header(i) includes a message name and protocol. If the answer is no, at step 308, the method determines whether the contents of header(i) are blank. If the contents are not blank, the method uses the index information into the MDC 115 or CNC 127 and stores the contents of header(i) in the received message in the table corresponding to header(i) (step 312). At step 314, the method increments "i." At step 316, the method determines whether all headers of the message have been processed. If all headers have been processed, at step 318, the method forwards the message to the TBP layer 112, 126 (FIG. 1) for processing. If all headers have not been processed, the method repeats step 308 to continue processing the remaining headers.

Referring back to step 307, if the answer is yes, the method proceeds to step 314 where "i" is incremented to continue processing of any remaining headers. Referring back to step 308, if the contents of header(i) in the message are blank, the method uses the index information to access the cache table corresponding to header(i) and extracts the information from the table to fill in the contents of header(i) in the message (step 310). Next, the method increments "i" at step 314 to continue processing of any remaining headers.

To illustrate how the TCCB compression and decompression methods operate, an example registration of a mobile device 100 with a P-CSCF 102 will now be described. The example features SIP messages exchanged between the mobile device 100 and P-CSCF 102. However, any text-based messages can be used with the present invention. The first example is a first registration after power up of the mobile device 100. To initiate the process, a REGISTER request is sent from the application layer 110 in the MD 100 (FIG. 1) to the TCCB layer 114. In the current example, the message has the following fields (headers):

REGISTER sip:bell-tel.com SIP/2.0
Via: SIP/2.0/UDP saturn.bell-tel.com
From: <sip:watson@bell-tel.com>; tag=19a1
To: sip:watson@bell-tel.com
Call-ID: 70710@saturn.bell-tel.com
Cseq: 1 REGISTER
Contact: <sip:watson@saturn.bell-tel.com:3890; transport=udp>
Expires: 7200

The message contains eight (8) headers: REGISTER, Via, From, To, Call-ID, Cseq, Contact and Expires. The content of each header is the information shown after the colon, with the exception of the first line (Request Line) where the content is everything after the message name. For example, the contents of the "REGISTER" header is "sip:bell-tel.com SIP/2.0." The contents of the "Via" header is "SIP/2.0/UDP saturn.bell-tel.com."

The TCCB layer 114, 128 invokes the compression method to compress the message (if possible) before sending it to the transport layers 116, 118, 120, 130, 132, 134 for transmission. Referring to the compression algorithm of FIG. 2, the method determines at step 202 that the message is a "REGISTER" message. This determination is made by looking at the Request Line (first line) of the message. At step 204, the method determines which header contains the correct index information into a table in the MDC 115 corresponding to the Request Line. In the preferred embodiment, the "To" header contains the index information for a "REGISTER" message. In an alternate embodiment, a different header or combination of headers may contain the index information. At step 206, the method initializes variable "i" to 1 to point to the first header (header (1)) of the REGISTER message. At step 207, the method determines that the REGISTER message has contents and at step 208, uses the contents of the "To" header as index information into the Request Line table in the MDC 115. In the current example, "sip:watson@bell-tel.com" is the correct index information. At step 210, the method determines whether the contents of the Request Line table match the contents of header(1) which, in the current example, is "sip:bell-tel.com SIP/2.0." Since, this is the first message transmitted, the message is not already stored in the MDC 115. At step 214, the method stores "sip.bell-tel.com SIP/2.0" in the Request Line table of the MDC 115.

At step 216, the method increments "i" to point to the "Via" header (header (2)) for processing. At step 218, the method determines that there are more headers to be processed and returns to step 207. The method repeats steps 207, 208, 210, 214, 216 and 218 until all headers have been processed. The method checks the contents of each header in the message against its corresponding table in the MDC 115 using the "To" header contents as the index information. Because this is the first message sent, none of the header contents are already stored in the MDC 115 and none of the header contents will be blanked. When the last header has been processed, the message is sent uncompressed (as shown above) to one of the lower transport layers 114, 118, 120 for transmission to the RAN 104 over the air interface 106. The message is stored in the MDC 115 as shown in FIG. 4. The RAN 104 forwards the message to the P-CSCF 102 via the IP interface 108.

Upon receiving the message, the P-CSCF 102 invokes the decompression method of the present invention. Referring to FIG. 3, at step 302 the method determines that it received a REGISTER message. At step 304, the method determines that for a REGISTER message, the "To" header contains the index information into the CNC 127 (FIG. 1). At step 306, the method initializes "i" to 1 to point to the first header of the received message. At step 307, the method determines that header(1) does not include a message name and protocol and, at step 308, determines that the contents of header(1) are not blank. At step 312, the method uses the index information to update the Request Line table with the contents of header (1), "sip:bell-tel.com SIP/2.0." At step 314, the method increments "i" to point to header(2). At step 316, the method determines that there are more headers to be processed and repeats steps 307, 308, 312, 314 and 316 until all headers have been processed. Once all headers are processed, the message is forwarded to the TBP layer 126 for processing (step 318). The CNC 127 contains the values shown in FIG. 5.

In the current example, the P-CSCF 102 responds to the "REGISTER" message with a "200 OK" message. The 200 OK message is as follows:

SIP/2.0 200 OK
Via: SIP/2.0/UDP Saturn.bell-tel.com
From: <sip:Watson@bell-tel.com>; tag=19a1
To: sip:Watson@bell-tel.com
Call-ID: 70710@saturn.bell-tel.com
Cseq: 1 REGISTER
Contact: <sip:Watson@Saturn.bell-tel.com:3890; transport=udp>

It should be noted that the 200 OK message has no contents. The header of the 200 OK message is "SIP/2.0 200 OK." The P-CSCF 102 invokes the compression method to determine whether any of the header contents can be blanked before transmission to the mobile device 100. Referring to FIG. 2, the method determines that the message is a 200 OK message (step 202). At step 204, the method determines that the "To" header contains the index information for a 200 OK message. (In an alternate embodiment, another header or combination of headers may contain the index information.) At step 206, the method initializes variable "i" to 1 to point to the Request Line header (header (1)). At step 207, the method determines that header(1) has no contents and proceeds to step 216 to increment "i." At step 218, the method determines that there are more headers to be processed and proceeds to step 207. At step 207, the method determines that header(2), the "Via" header has contents. At step 208, the method uses "sip:watson@bell-tel.com" as the index information into the Via table of the CNC 127. As shown in FIG. 5, the contents of the Via table are "SIP/2.0/UDP saturn.bell-tel.com." Thus, at step 210, the method determines that the contents of the Via table in the CNC 127 match the contents of the Via header in the message (header (2)). At step 212, the method determines that header(2) is not the type of message and does not contain the index information and blanks the contents of the Via header (step 222). Next, the method proceeds to step 216 to increment "i".

At step 218, the method determines that there are more headers to be processed and proceeds to step 207. At step 207, the method determines that header(3) has contents and at step 208, uses "sip:watson@bell-tel.com" as index information into the "From" table of the CNC 127. As shown in FIG. 5, the content of the "From" table is "<sip:watson@bell-tel.com>; tag=19a1" which matches the content of the From header in the 200 OK message. At step 210, the method determines there is a match and at step 212 determines whether the From header indicates the type of message or contains the index information. Since the answer to both questions is no, the method blanks the contents of the From header (step 222) and increments "i" at step 216 to process the "Call-ID" header (header(4)).

After the remaining headers are processed, the compressed 200 OK message is:

SIP/2.0 200 OK
Via:
From:
To: sip:watson@bell-tel.com
Call-ID:
Cseq:
Contact:

The compressed message is sent to one of the lower transport layers 130, 132, 134 for transmission to the mobile device 100.

Upon receipt of the compressed 200 OK message in the TCCB layer 114 of the mobile device 100, the decompression method is invoked. Referring to FIG. 3, the method determines that a "200 OK" message has been received (step 302). At step 304, the method determines that the contents of the "To" header contains the index information into the MDC 115. At step 306, variable "i" is initialized to 1. At step 307, the method determines that the header(1) includes a message name (200 OK) and protocol (SIP) and at step 314 increments "i." At step 316, the method determines that there are more headers to be processed and proceeds to step 307. At step 307, the method determines that header(2) does not include a message name and protocol. At step 308, the method determines that the contents of header(2) are blank and uses "sip:watson@bell-tel.com" to extract the information from the "Via" table (SIP/2.0/UDP saturn.bell-tel.com) to fill in the contents of the "Via" header in the message. At step 314, the method increments "i" to point to header(3). At step 316, the method determines that there are more headers to be processed and proceeds to step 308. The method repeats steps 307, 308, 310, 312, 314 and 316 until all headers in the message have been filled in from information in the MDC tables. At step 318, the decompressed message will be forwarded to the TBP layer 112 for processing.

The compression and decompression methods of the present invention can also be implemented using multiple level indexing into the MDC 115 and CNC 127. As an example, consider an "INVITE" message transmitted from the mobile device 100 to the P-CSCF 102 after the mobile device 100 has successfully registered with the P-CSCF 102. For an INVITE message, the compression and decompression methods use both the "From" and "To" header contents as the index information into the MDC 115 and CNC 127, when necessary. The "From" contents provide the first level of indexing while the "To" offers a further level of granularity, should it be required. An example INVITE message with SDP information removed is:

INVITE sip:simpson@springfield.bell-tel.com SIP/2.0
Via: SIP/2.0/UDP saturn.bell-tel.com
From: T. Watson <sip:watson@bell-tel.com>
To: H. Simpson <sip:simpson@bell-tel.com>
Call-ID: 662606876@saturn.bell-tel.com
CSeq: 6 INVITE
Contact: <sip:watson@saturn.bell-tel.com>
Subject: Mr. Simpson, Going to Moe's?
Content-Type: application/sdp When the TCCB layer 114 receives the INVITE message, it invokes the compression algorithm. Referring to FIG. 2, the method determines that the message is an INVITE message (step 202). At step 204, the method determines that the "From" and "To" header (when necessary) contains the index information for an INVITE message. At step 206, the method initializes variable "i" to 1 to point to the Request Line header (header (1)). At step 207, the method determines that header(1) has contents, and at step 208 uses the From header contents (sip:Watson@bell-tel.com) as the index into the Request Line table in the MDC 115. At step 210, the method determines that the table contents (see FIG. 4) do not match the contents of the INVITE header in the message. Because the contents did not match, the method uses the To header contents (<sip:simpson@bell-tel.com>) to access the Request Line table in the MDC 115. Because <sip:simpson@bell-tel.com>has not been used as index information into the Invite table before, the Invite table at that index does not match the contents of the INVITE message in the header. At step 214, the method stores the contents of the INVITE message in the Request Line table. At step 216, the method increments "i" and at step 218 determines that there are more headers to be processed.

At step 207, the method determines that header(2) has contents. At step 208, the method uses the contents of the From header as the index information into the Via table of the MDC 115. As shown in FIG. 4, the contents of the Via table are "SIP/2.0/UDP saturn.bell-tel.com." Thus, at step 210, the method determines that the contents of the Via table in the MDC 115 match the contents of the Via header in the message (header(2)). Because there is a match, there is no need to use the second level of indexing (To header) into the Via table. At step 212, the method determines that header(2) is not the type of message and does not contain the index information and blanks the contents of the Via header (step 222). Next, the method proceeds to step 216 to increment "i At step 218, the method determines that there are more headers to be processed and returns to step 207. The method repeats steps 207, 208, 210, 214, 216 and 218 until all headers have been processed. The method checks the contents of each header in the message against its corresponding table in the MDC 115 using first the 'From" header contents as the index and if there is no match, the "To" header contents are used to again access the table. If there is no match for the second time, the contents of the header in the message are stored in the table at the index corresponding to the To header information. If the message header is a new header (i.e., a header not already used in a message before such as the Subject and Content Type headers in the current example), the contents of the header in the message are stored in the MDC table twice, once at the location corresponding to the From header index information and again at the location corresponding to the To header index information. After each header has been processed, the MDC tables contain the information shown in FIG. 6.

In the current example, the only match found from comparing the header contents in the message to the header contents in the MDC tables is the "Via" header. (Compare FIGS. 4 and 6). The MDC 115 was updated for all other fields, with the combination of the "From" and "To" header contents used for the index information. The compressed INVITE message below is sent to the P-CSCF 102.

INVITE sip:simpson@springfield.bell-tel.com SIP/2.0
Via:
From: T. Watson <sip:watson@bell-tel.com>
To: H. Simpson <sip:simpson@bell-tel.com>
Call-ID: 662606876@saturn.bell-tel.com
CSeq: 6 INVITE
Contact: <sip:watson@saturn.bell-tel.com>
Subject: Mr. Simpson, Going to Moe's?
Content-Type: application/sdp Upon receipt of the compressed INVITE message, the TCCB layer 128 in the P-CSCF 102 invokes the decompression method. Upon determining that the message is an INVITE message, the method uses the "From" and "To" headers to access the CNC 127. In the current example, the method fills in the contents of the Via header in the message with information in the Via table of the CNC 127. For the other headers in the message, the tables in the CNC 127 are updated with the current information.

Those skilled in the art will recognize that various modifications and variations can be made in the apparatus and method of the present invention and in construction of this apparatus without departing from the scope or spirit of this invention. For example, error checking and handling could be incorporated into the method. The method could perform a checksum on each message before compressing and send the result to the decompressor in the receiving device with the message. Upon decompressing the message, a checksum could be performed on the reconstructed message and the result compared with the original value. If an error is detected, the application layer 110, 124 could be informed using error handling capabilities.

Additionally, bitwise tags may be used for the message headers rather than the text format as described herein. For example, when applied to SIP, the TCCB layer in both nodes (mobile device 100 and P-CSCF 102) may be initialized with the following mappings:

| | |
|---|---|
| Via: | 0x000158 |
| From: | 0x000258 |
| To: | 0x000358 |
| Call-ID: | 0x000458 |
| Cseq: | 0x000558 |
| Contact-length: | 0x000658 |

When sending the compressed message "Via:" would be replaced with 0x000158, and so on. Alternatively, Huffman encoding could be used for the tag format.

As seen in the example of the INVITE message, multiple levels of indexing may be used to cache and retrieve information. Additional information may be used from the message to provide a further level of granularity, where required. The number of levels of indexing implemented will be dependent on the optimum compression rates depending on the characteristics of the protocol. For example, in order to improve the efficiency of the method, a three level indexing could provide further compression (e.g. From: contents +To: contents +Cseq: contents).

Further compression could be achieved in a system where a mandatory header scheme is implemented. A mandatory header scheme is a scheme whereby certain headers must be included in every message. In such a system, further compression could be achieved by not including the header title in the compressed message where the header contents have been blanked.

What is claimed is:

1. In a sending device having a memory, a method of compressing a message having a plurality of headers comprising the steps of:

determining a characteristic of the message;

based on the characteristic of the message, determining which part of the message contains index information into the first memory;

for each of the plurality of headers in the message, using the index information into the memory to determine whether contents of the header are stored in the memory; and if contents of the header are stored in the memory, blanking the contents of the header in the message.

2. The method of claim 1 further comprising the step of if the contents of the header are not stored in memory, storing the contents of the header in memory.

3. The method of claim 2 wherein the index information corresponds to contents of at least one predetermined header in the message.

4. The method of claim 1 wherein the contents of the header in the message are not blanked if the header indicates message type or contains the index information.

5. In a receiving device having a memory, a method of decompressing a message having a plurality of headers comprising the steps of:

determining a characteristic of the message;

based on the characteristic of the message, determining which part of the message contains index information into the memory;

for each of the plurality of headers in the message, determining whether contents of the header is blank; and if the contents of the header are blank, using the index information into the memory to retrieve information to fill in the contents of the header.

6. The method of claim 5 further comprising the step of if the contents of the header are not blank, using the index information into the memory to store the contents of the header in an appropriate location in the memory.

7. The method of claim 5 wherein the index information corresponds to contents of at least one predetermined header in the message.

8. An apparatus for compressing a text message before transmission over an air interface, the apparatus having a software architecture comprising an application layer, a text based protocol layer, and a physical layer, the apparatus further comprising:

a text based compression/decompression layer for determining a characteristic of the message;

based on the characteristic of the message, determining which part of the message contains an index information into the first memory;

for each of a plurality of headers in the message, using the index information into the memory to determine whether contents of the header are stored in the memory; and if contents of the header are stored in the memory, blanking the contents of the header in the message.

9. An apparatus for decompressing a text message, the apparatus having a software architecture comprising an application layer, a text based protocol layer, and a physical layer, the apparatus further comprising:

a text based compression/decompression layer for determining a characteristic of the message;

based on the characteristic of the message, determining which part of the message contains an index information into the memory;

for each of a plurality of headers in the message, determining whether contents of the header are blank; and if the contents of the header are blank, using the index information into the memory to retrieve information to fill in the contents of the header.

* * * * *